US005859867A

United States Patent [19]
An et al.

[11] Patent Number: 5,859,867
[45] Date of Patent: Jan. 12, 1999

[54] MICROLASER

[75] Inventors: Kyungwon An, Woburn; James J. Childs, Reading; Ramachandra Rao Dasari, Lexington; Michael S. Feld, Newton, all of Mass.

[73] Assignee: Massachusetts Institute of Technology, Cambridge, Mass.

[21] Appl. No.: 565,344

[22] Filed: Nov. 30, 1995

[51] Int. Cl.⁶ .................................................... H01S 3/091
[52] U.S. Cl. ................................ 372/70; 372/73; 372/99; 372/108
[58] Field of Search .................................. 372/2, 10, 39, 372/69, 70, 73, 74, 76, 92, 99, 107, 108

[56] References Cited

U.S. PATENT DOCUMENTS

| 5,381,431 | 1/1995 | Zayhowski | 372/10 X |
| 5,394,413 | 2/1995 | Zayhowski | 372/10 |

OTHER PUBLICATIONS

E.T. Jaynes, et al., "Comparison of Quantum and Semiclassical Radiation Theories with Application to the Beam Maser," *Proceedings of the IEEE*, vol. 51, pp. 89–109 (Jan. 1963).

R. J. Thompson, et al., "Observation of Normal–Mode Splitting for an Atom in an Optical Cavity," *Physical Review Letters*, 68 (8) :1132–1135 (24 Feb. 1992).

R. Filipowicz, et al. "Theory of a Microscopic Maser," *Physical Review A*, 34(4) :3077–3087 (Oct. 1986).

D. Meschede, et al., "One–Atom Maser," *Physical Review Letters*, 54(6) :551–554 (11 Feb. 1985).

G. Rempe, et al., "The One–Atom Maser and the Generation of Nonclassical Light," *Physica Scripta*, T34:5–13 (1991).

S. Haroche, et al., "Cavity Quantum Electrodynamics—A New Generation of Experiments Shows that Spontaneous Radiation From Excited Atoms Can Be Greatly Suppressed or Enhanced By Placing the Atoms Between Mirrors or in Cavities," Physics Today, pp. 24–30 (Jan. 1989).

P.G. Kwiat, et al., "High–Efficiency Single–Photon Detectors," *Physical Review A*, 48(2) :R867–R870 (Aug. 1993).

J. Krause, et al., "Preparation of a Pure Number State and Measurement of the Photon Statistics in a High–Q Micromaser," *Physical Review A*, 39(4) : 1915–1921 (Feb. 15, 1989).

G. Rempe, et al., "Observation of Quantum Collapse and Revival in a One–Atom Maser" *Physical Review Letters*, 58(4) :353–356 (26 Jan. 1987).

G. Rempe, et al., "Measurement of Ultralow Losses in an Optical Interferometer," *Optics Letters*, 17(5) :363–365 (Mar. 1, 1992).

"Single–Atom Laser Technique Developed," *MIT Tech*, 39(12) (Nov. 16, 1994), 2 pp.

(List continued on next page.)

*Primary Examiner*—John D. Lee
*Attorney, Agent, or Firm*—Hamilton, Brook, Smith & Reynolds, P.C.

[57] ABSTRACT

In a single-atom microlaser, a pair of opposed reflectors define a high-finesse or "high-Q" optical cavity therebetween. A source delivers a stream of multiple-energy-level atoms or particles into the cavity. Each individual atom in the stream is excited by a pump from a lower energy level to an upper energy level before injection into the cavity. The cavity resonance frequency is substantially matched to the frequency of a photon emitted by each atom as it enters the cavity. The photon is emitted due to a transition in energy between the upper level and lower level of each atom. In this manner, upon entry of a sequence of individual atoms into the cavity for example, the average number of photons resonating in the cavity exceeds one and the average number of atoms in the cavity is less than one. The photons are sustained in the high-Q cavity for a long enough time period such that the photon field interacts with the next atom in the stream. A beam of coherent light in the optical frequency spectrum is emitted from the cavity.

30 Claims, 9 Drawing Sheets

OTHER PUBLICATIONS

G. Rempe, "Single Atoms Light Up in Microlaser," *Physics in Action*, p. 31 (Apr., 1995). [*Physics World*].

F. Flam, "Coaxing Light From Single Atoms," *Science*, vol. 266 (Dec. 2, 1994), p. 1473.

J. Maddox, "The Wonders of the Microlaser," *Nature*, vol. 373, p. 101 (12 Jan. 1995).

"Cavity Lases When Occupied, On Average, By Less Than One Atom," *Physics Today*, pp. 20–21 (Feb. 1995), Barbara Goss Levi.

E.A. Thomson, "Single–Atom Laser Technique Achieved," *The MIT Report*, pp. 4 (Dec./Jan. 1994/95).

K. An, et al., "Microlaser: A Laser With One Atom in An Optical Resonator," *Physical Review Letters*, 73(25):3375–3378, 19 Dec. 1994.

K. An, et al., "Role of Standing–Wave Mode Structure in Microlaser Emission," *Physics Review A*, pp. 1–16 (Jan. 30, 1995).

K. An, et al., "One–Step Absolute Frequency Stabilization of a Ti:Sapphire Laser Using FM Lamb–Dip Spectroscopy," *Applied Physics Letters*, pp. 1–9 (1995).

MICROLASER

This invention was made with government support under Grant Numbers 9112421-PHY and 9304251-CHE awarded by the national Science Foundation. The government has certain rights in the invention.

BACKGROUND OF THE INVENTION

An interesting problem in quantum optics is the interaction between a single atom and a single quantized mode of an electromagnetic field. This problem has an exact solution if irreversible processes which give rise to damping, such as atomic spontaneous emission and decay of the field mode, are negligible. If they are negligible, the atom and the field mode exchange energy in a manner characteristic with that of coupled oscillators. The rate of energy exchange, determined by the atom-field coupling strength, can be appreciable even for a vacuum field. This coupling has been observed in the line shape splitting for a weakly-excited absorbing atom.

Atom-cavity interaction is often referred to as cavity quantum electrodynamics (hereinafter "cavity QED"). The single-atom maser or micromaser, one system for studying cavity QED was developed in 1985, and various aspects of cavity QED such as quantum collapse and revival and nonclassical atom statistics have been studied.

In a single-atom micromaser, a beam of excited atoms is injected into a high-Q microwave resonator. The stream of atoms is injected at a controlled flux rate so that not more than one atom is present inside the cavity at any time. A photon released into the cavity by each atom resonates in the cavity for a long enough time period to interact with subsequent atoms in the stream. The coupling between the single atom and the photon field strengthens as the field builds up, and can eventually become steady-state. Single-atom masers operate in the microwave regime. The photons released by the interaction are of low energy and momentum and therefore are difficult to detect and monitor. The resonators are made with walls composed of low temperature superconductive material and are thus difficult to maintain and expensive to fabricate.

SUMMARY OF THE INVENTION

In contrast, the microlaser of the present invention operates in the optical regime, generating photons of relatively high energy and momentum. This allows measurement of microlaser output characteristics such as the mean photon number and emission spectra via photon detection, as compared to the micromaser wherein only atoms can be sensed and the photons cannot be detected. The increased photon momentum enables study of the interaction of quantized Rabi oscillations with the mechanical degrees of freedom of the atom, as exchange of a single optical photon with a cavity field can significantly deflect the trajectory of the atomic stream. Photon counting detectors with efficiencies of up to eighty percent recently became available, thereby providing for the study of photon statistics in the microlaser. Furthermore, linewidth measurement is straightforward in the microlaser, while it is yet to be accomplished in the micromaser, where a complicated Ramsey-fringe-type configuration is required.

The present invention is directed to an apparatus and method for generating coherent radiation in the optical spectral region. The apparatus of the invention includes a pair of opposed reflectors defining a high-finesse or "high-Q" optical cavity therebetween. A source delivers a stream of multiple-energy-level atoms or particles into the cavity. Each individual atom or particle in the stream is excited by a pump from a lower energy level to an upper energy level before injection into the cavity. The cavity resonance frequency is substantially matched to the frequency of a photon emitted by each atom as it enters the cavity. The photon is emitted due to a transition in energy between the upper level and lower level of each atom. In this manner, upon entry of a sequence of individual atoms into the cavity, the average number of photons resonating in the cavity can exceed the average number of atoms in the cavity. In particular, the average number of photons in the cavity can build up and substantially exceed unity even if the average number of intracavity atoms is less than one. An exit aperture permits laser radiation in the optical spectral region to be released from the cavity.

Where particles are sequentially injected, each particle comprises the same atom or substantially the same number of atoms or molecules. This will further increase photon density in the cavity even though the number of particles in the cavity at any instant in time is one or less.

In a preferred embodiment, the atom injection rate is controlled such that the mean number of atoms in the cavity at any given time is less than one. The stream of atoms can be excited to the higher energy level by an optical pump. The cavity is preferably a high-finesse optical cavity which is stabilized by monitoring movement of the mirrors and by adjusting the position of the mirrors in response to the movement. Because the photons released by the transition in energy are optical photons, they can be directly sensed by a photon detector. The emitted coherent radiation can be coupled directly to an optical fiber. The atomic stream can be comprised of atoms selected from the group consisting of: barium, cesium and ytterbium.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8A is the mean number of photons; FIG. 8B is the Mandel Q parameter; and FIG. 8C is the emission linewidth.

DETAILED DESCRIPTION OF PREFERRED EMBODIMENTS

Figure 1:
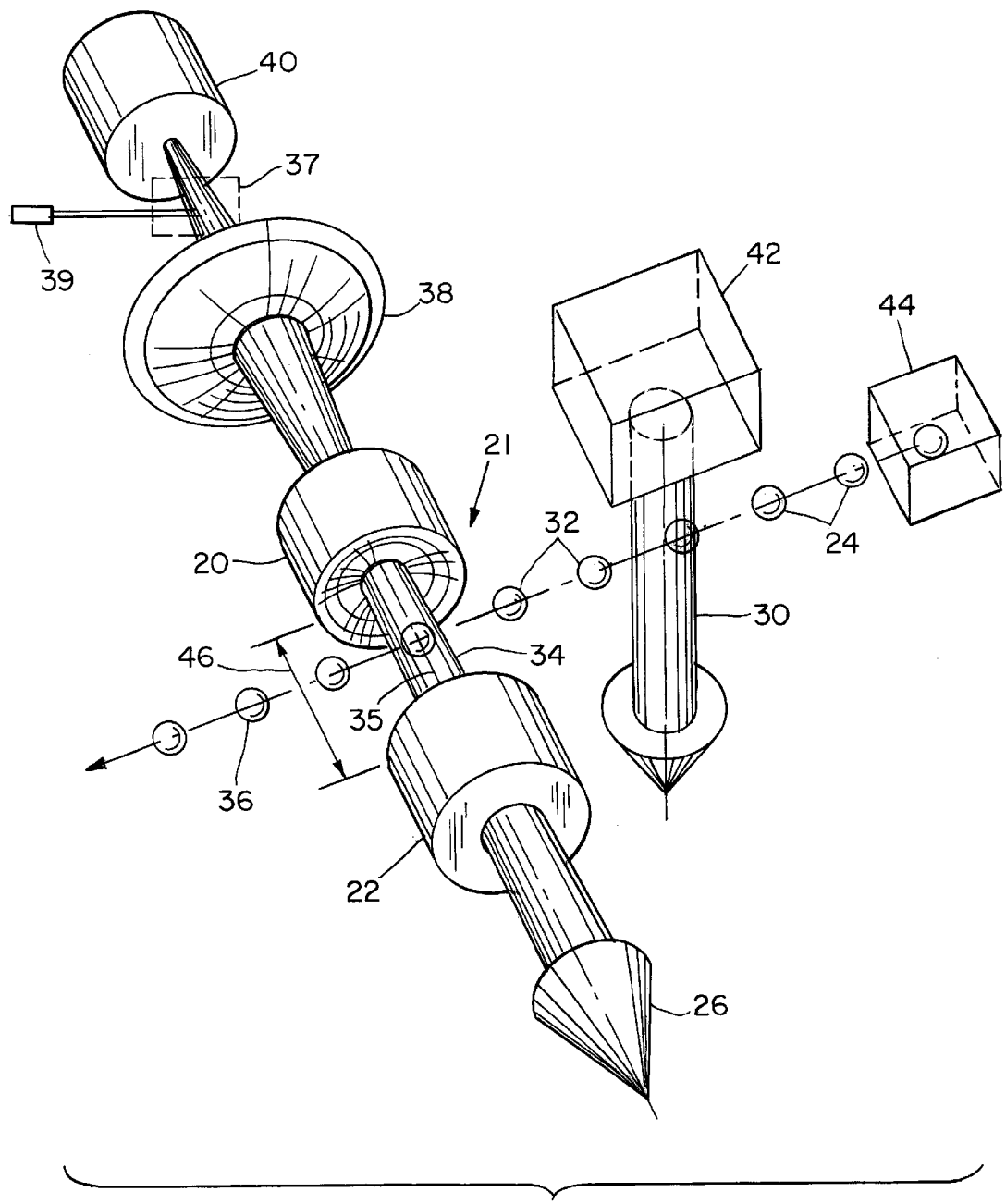
FIG. 1 is a block diagram of a single-atom microlaser in accordance with the present invention.

FIG. 1 is a block diagram of a preferred embodiment of a microlaser in accordance with the present invention. The microlaser includes a source of atoms (or particles) 44, an optical pump 42, and an optical cavity 21 defined between first and second opposing reflectors 20, 22. The system undergoes laser oscillation with an average atom or particle count <N> in the cavity 21 of less than one at any time, yielding an average photon count in the cavity <n> greater than unity.

The atom source 44 releases a stream of individual multiple-energy-level atoms 24 emitted at a low energy level. The stream of atoms 24 passes through a beam of energy 30 emitted by a pump 42. The pump 42 is preferably an optical pump, but any means for exciting the atoms may be used. As the atoms 24 pass through the pump beam 30, they absorb energy and are excited to a higher energy level. The excited atoms 32 are individually injected into the optical cavity 21.

The first excited atom 34 in the stream to enter the cavity 21 undergoes a vacuum Rabi oscillation due to the coupling between the atom 34 and the cavity 21. This causes a downward energy transition, releasing a photon which resonates between the mirrors 20, 22. The photon field 35 is sustained in the cavity 21 for a period of time long enough such that the remanent photon field interacts with the next energized atom 32 in the stream, causing the energy of the later-injected atom to be released in the form of an additional photon. The photon released by the later-injected atoms 34 delivers additional coherent energy into the photon field 35, periodically refreshing the field. The second reflector 22 is partially transmissive of electromagnetic energy at the wavelength of the photon field 35, providing an exit aperture for emission of a beam of coherent optical energy 26 from the cavity 21. The stream of deenergized multiple-level atoms 36 that have passed through the cavity 21 are disposed or recycled.

Amplification of the photon field 35 occurs by quantized Rabi oscillations as further atoms 32 are introduced into the cavity. This leads to an equilibrium situation in which, despite the dynamical atom-field interaction, the number of photons in the cavity remains nearly constant, and the small energy loss due to cavity decay and atomic spontaneous decay is exactly balanced by the mean energy transfer from the stream of excited atoms 32 to the photon field mode 35.

A major obstacle in the development of the microlaser has been the technical difficulty in fabricating a high-Q cavity in the optical regime. Recently, supercavity technology has improved to the point where a cavity with a finesse of $10^6$ or greater is achievable. To realize this, the resonators 20, 22 are preferably supercavity mirrors mounted so as to minimize mechanical vibrations.

In a preferred embodiment, two supercavity mirrors 20, 22 with a radius of curvature of 10 cm, were separated by 1 mm. The transit time of atoms across the cavity mode is preferably less than 1 microsecond with a mode diameter of about 100 microns. The mirrors were mounted with a piezoelectric transducer in order to allow frequency tuning of the cavity through the atomic resonance. The cavity exhibited a finesse of $8 \times 10^5$, corresponding to a linewidth of 190 kHz. The finesse was measured using the ringdown technique described in. Rempe, G. et al., "Measurement of ultralow losses in an optical interferometer" *Optics Letters*, 17(5):363–365 (Mar. 1, 1992), the entire contents thereof being incorporated herein by reference. The free spectral range was 150 GHz and the transverse mode separation was 6.8 GHz, so excitation of the single $TEM_{00}$ mode was easily ensured. The waist of the photon field mode was 42 $\mu$m. The geometry of the cavity and the atomic dipole moment determined $g_0$ to be 340 kHz, where $g_0$ is the atom-field coupling constant, thereby satisfying the strong-coupling condition for one atom. More details regarding the cavity can be found in "Microlaser: A laser with one atom in an optical resonator", by An et al., Phys. Rev. Lett. 73,3375 (1994) the contents of which are incorporated herein by reference.

In its free-running state, the cavity frequency drifted slowly, at a rate of about 1 MHz/s, with a short-term stability of better than 50 kHz rms. When the system was aligned, active stabilization using a sideband locking technique locked the cavity frequency to that of the pump laser with about 100 kHz offset. This locking laser beam, split off from the pump laser, was modulated by an acousto-optic modulator in a double-pass configuration free of the frequency shift in such a way that the output signal of the microlaser was measured only when the locking laser was blocked.

Laser oscillation was obtained on the $^3P_1(m=0) \rightarrow {}^1S_0$ transition of $^{138}Ba$. The wavelength for this transition is 791 nm and the radiative linewidth is about 50 kHz. Naturally abundant barium metal, of which 72% is $^{138}Ba$, was evaporated in an atomic beam oven. The temperature of the oven was varied around 550° C., resulting in an rms thermal velocity of 320 m/s and an atomic density of $4 \times 10^5$ atoms/cm$^3$, inside a single-mode cavity located 43 cm from the oven aperture. To calibrate the density, the fluorescence for the $^1P_1 \leftrightarrows {}^1S_0$ transition of $^{138}Ba$ atoms ($\lambda$=553 nm) in the cavity mode was used. A 340 $\mu$m aperture was placed in front of the cavity to provide transverse confinement of the atomic beam.

The atoms were excited from the $^1S_0$ ground state to the $^3P_1(m=0)$ excited state by means of a continuous wave Ti:sapphire pump laser 42 (Coherent model 899-29) just before the entrance to the cavity 21. The waist and intensity of the pump beam 30 were adjusted so that the velocity group of atoms with the most probable speed were subjected to a $\pi$ pulse, thereby achieving maximum population in the upper energy level. The waist of the pump beam was measured to be 30 $\mu$m, with corresponding transit time (broadening) of 190 ns (4 MHz). A dc magnetic "keeper" field of about 10 G was applied parallel to the pump field polarization, which was along the atomic beam, in order to insure that only $\Delta m=0$ transitions could occur.

The pump laser 42 had a frequency stability of 300 kHz relative to its low-Q reference cavity. However, the frequency of the reference cavity drifted by 2 to 3 MHz over a period of tens of milliseconds. Such performance was not acceptable for the required stability of the pumping process.

Figure 4:
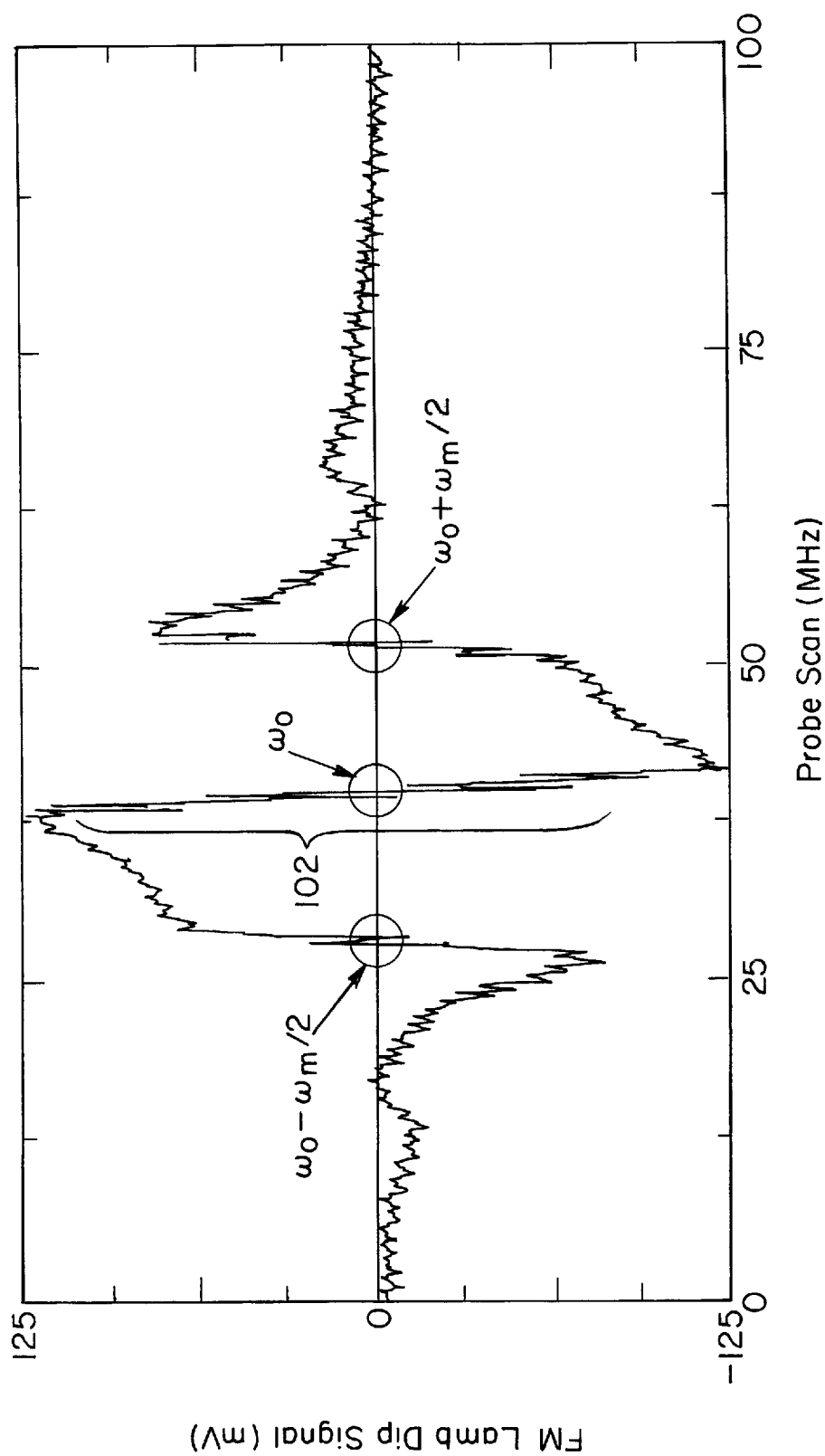
FIG. 4 is a chart of the dispersion lineshape of a Lamb-dip signal.

In order to eliminate the frequency jitter and to lock the frequency to the atomic transition, an FM locking technique employing a separate barium vapor cell in a Lamb-dip configuration was used. This technique is described below in conjunction with FIG. 4 and FIG. 5. A dispersion-type FM error signal then replaced the error signal from the laser reference cavity. This technique achieved about 50 kHz rms short-term jitter superimposed on 300 kHz rms long-term jitter oscillating at 660 Hz. This slow jitter seemed to originate mechanically from a galvo-driven tipping plate in the laser. No further efforts were made to compensate the slow jitter because at this level the frequency uncertainty is far less than the transit-time broadening.

A silicon avalanche photodiode 40 with a thermoelectric cooler (EG&G model C30902S-TC) was used in the photon-counting mode to detect the output of the microlaser. Microlaser emission 26 was imaged by a lens 38 onto the photon-counting detector 40. When the detector was cooled to $-20°$ C., the counting efficiency measured on a photon counter was 36%. With a passive quenching circuit, the detector started to saturate at around $10^4$ counts/second yielding a 10% reduction in registered counts. When the output signal was larger than that level, neutral density filters were used to attenuate the signal.

For some applications high quantum-efficiency photon detector is preferred. Data indicates that the counting efficiency can be increased up to 60% by increasing the bias voltage on the photon detector. The microlaser output spectrum can be obtained by measuring the first-order coherence function of the emitted photons. For this the microlaser output can be split into two beams, one of which is delayed by a fixed time interval, and then recombined. This recombines beam will exhibit interference as a function of the time delay, the amplitude which is a measure of the first-order coherence function of the microlaser emission. The emission spectrum is given by the Fourier transform of this function. The output beam can be split at 37 and coupled to a fiber optic device 39. The time delay can be achieved by means of various lengths of polarization-preserving single-mode optical fiber. The fiber optic device can deliver the split portion of the beam to a separate detector or the fiber optics can be used to recombined the beams downstream prior to detector 40. A numerical simulation of the emission linewidth indicates that the baseline linewidth value is about 300 kHz. This corresponds to a coherence length of 160 m. The delay can be fine-tuned with an additional short delay line comprised of a mirror mounted on a piezoelectric transducer (PZT). By scanning the PZT, the interference fringes can be measured for a given length of optical fiber. This procedure, repeated for various fiber lengths, will result in the first-order coherence function.

In a typical measurement, the position of the pump laser and the incident angle of the laser beam relative to the atomic beam were adjusted to maximize the output signal. Also, the angle between the atomic beam and the cavity axis with the active cavity locking engaged were adjusted, while maximizing the output signal. Once the system was aligned, the cavity locking was disengaged and the cavity was permitted to drift slowly through the atomic transition. The cavity transmission of the locking laser was monitored to mark the instant when the cavity became resonant with the sidebands and the central peak of the frequency-modulated locking laser at 25 MHz. These frequency stamps were used to calibrate the frequency axis of the measured signal. The cavity drift was measured to be quite uniform over the 50 MHz scan range, with linearity error less than 400 kHz. Note that by tilting the atomic beam by a small amount relative to the cavity axis, photons emitted in opposite directions will be Doppler shifted to different frequencies. If the cavity is tuned to one traveling-wave component, the other component will be non-resonant, thereby achieving a traveling-wave cavity mode with uniform coupling across the cavity. The tilt angle must be sufficient to insure that the Doppler shift exceeds the transit time broadening associated with the short interaction time between the atom and the cavity field.

Figure 2A:
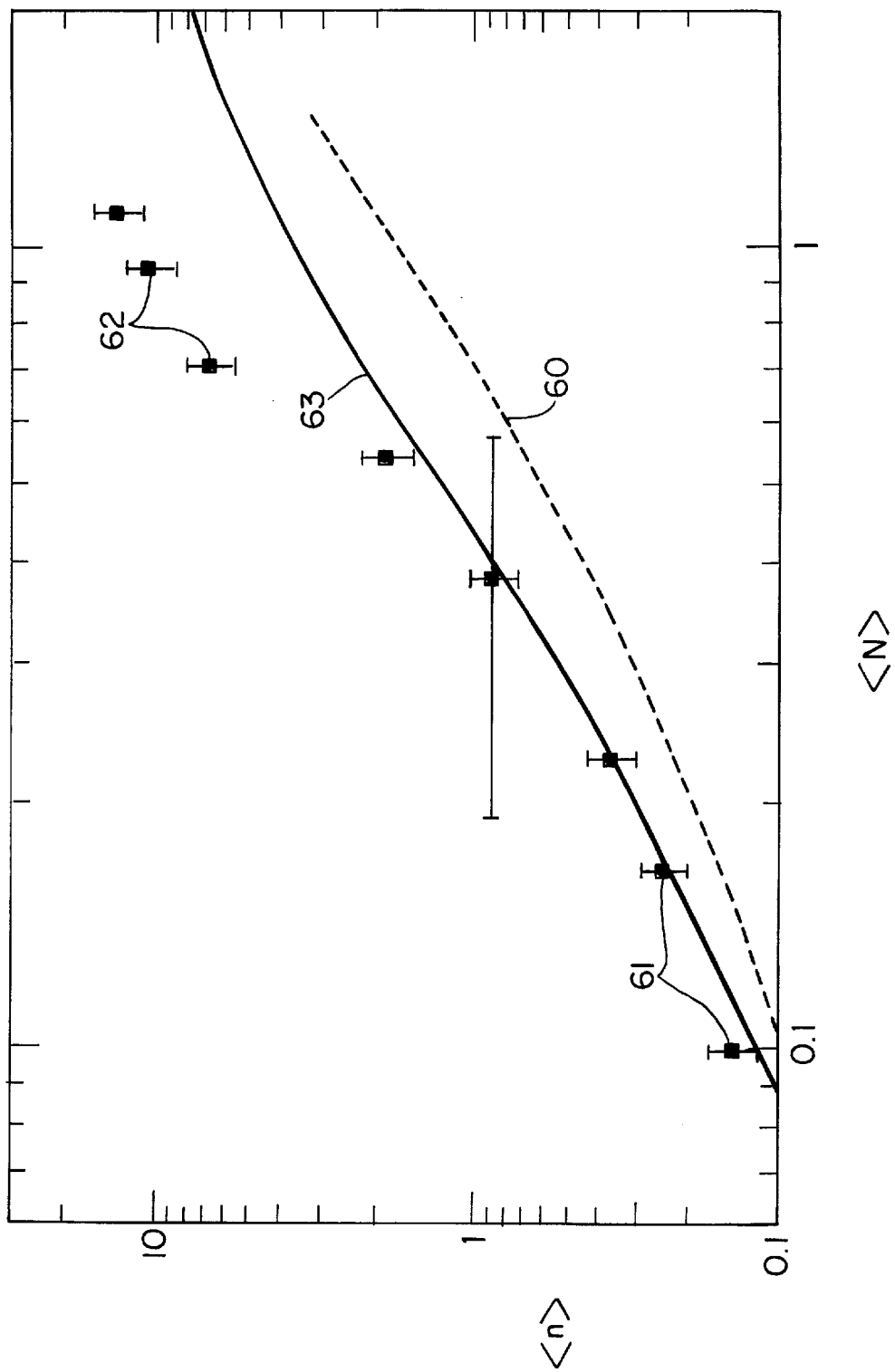
FIG. 2A is a chart of mean photon count in the cavity as a function of mean atom count in the cavity comparing the micromaser theory with the theory and experimental results of the present invention.
Figure 2B:
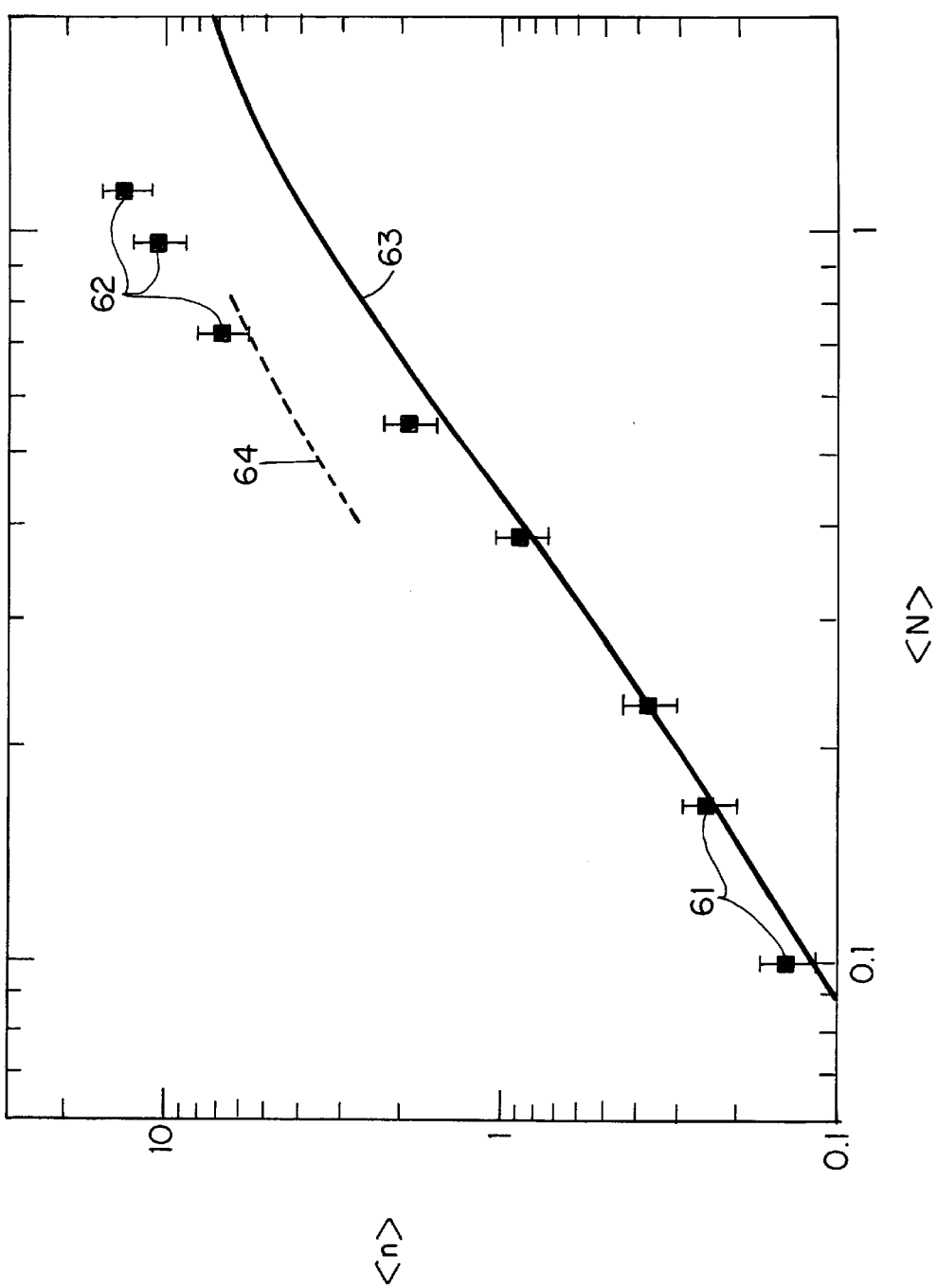
FIG. 2B is a chart of mean photon count in the cavity as a function of mean atom count in the cavity demonstrating the theory and experimental results of the present invention.
Figure 3A:
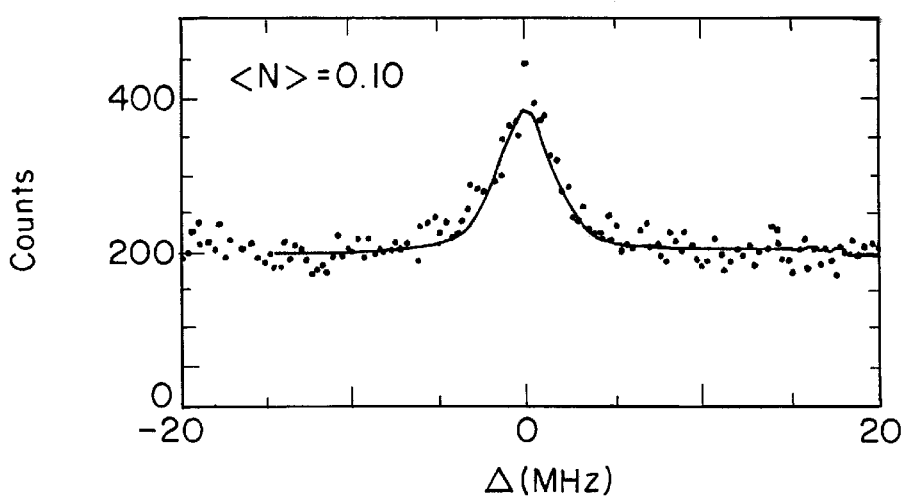
FIGS. 3A–3C are charts of signal output from the experimental microlaser embodying the present invention as functions of cavity-atom detuning for varying mean number of atoms <N> in the cavity mode.
Figure 3B:
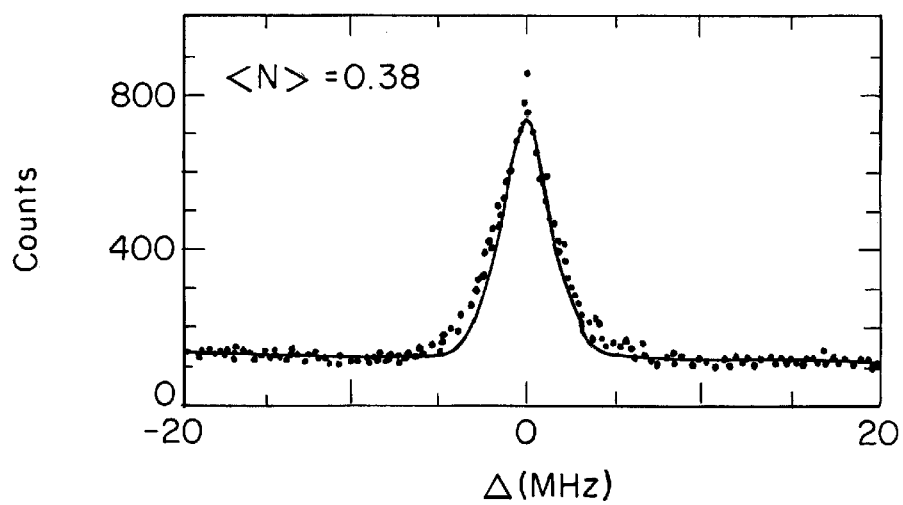
Figure 3C:
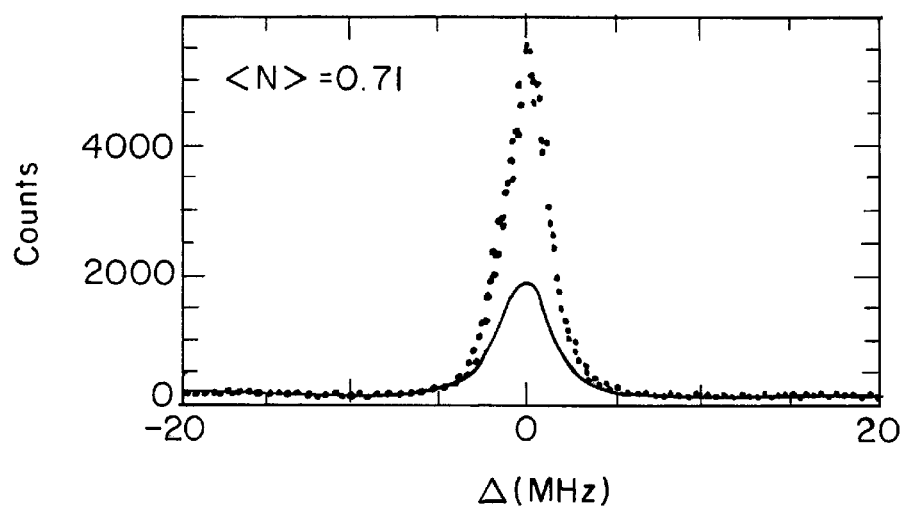

FIGS. 3A–3C are charts of signal output from the microlaser as a function of cavity-atom detuning. The mean number of atoms in the cavity mode <N> was varied: (a) 0.10 in FIG. 3A, (b) 0.38 in FIG. 3B, and (c) 0.71 in FIG. 3C. The uncertainty in the number of atoms is 50%, due to accumulated systematic errors in the fluorescence calibration. The counting time per point was 25 msec for FIG. 3A and 12.4 msec for FIG. 3B and FIG. 3C. The solid line is the theoretical prediction of the one-atom quantized field model described below. From the peak values of these curves, we can find the average number of photons in the cavity mode, shown in FIG. 2.

The increased photon momentum makes it possible to study the entanglement of the quantized Rabi oscillations with the mechanical degrees of freedom of the atom, as exchange of a single optical photon with the cavity field can significantly deflect the atomic trajectory. This is described below in conjunction with FIG. 6. In addition, the absence of blackbody radiation at optical frequencies enables the study of the features of quantum collapse and revival which are entirely due to the superposition of discrete photon-number Fock states in the cavity field. Also, generating and studying photon-number trapped states is enabled.

The microlaser measurement described above studies the mean photon count in the cavity <n> as a function of the average number of atoms present in the cavity <N>. For <N><<1 the experimental results agreed with the predictions of the fully quantized single-atom microlaser theory. However, at about <N>≅0.6, a rapid increase in <n>, not predicted by the theory, was observed, and as <N> approached unity, <n> was found to be anomalously large. This deviation is believed to be caused by two effects: breakdown of one-atom theory, and the standing-wave mode structure of the cavity combined with the saturation effect for large <N>. Note that the one-atom quantum theory is not valid when <N> approaches unity. Due to the Poissonian distribution of the number of atoms, the probability of having two or three atoms in the cavity is then comparable to that of having only one atom present. In addition, there exists a second effect that can also increase <n>, even when, for example, <N>≅0.6, for which the single-atom assumption is probably not significantly violated (probability for more than one atom is 13% compared to 26% when <N>=1). This effect is associated with the standing-wave nature of the optical resonator mode. The standing-wave spatial dependence directly reflects itself in the spatial dependence of the atom-cavity coupling, and can have a profound effect on the number of photons in the cavity mode. As shown below, this feature, coupled with the saturation of the atom-field interaction for large <n>, can explain the observed rapid increase in <n> near <N>≅0.6.

The theory behind the microlaser of the present invention will now be described. In the microlaser measurement, the atoms are prepared by passing the atomic beam 24 through an excitation laser beam 30 just before they entered the cavity 21. The intensity and waist of the pump beam 30 were adjusted so that atoms 34 entering the cavity 21 with the most probable velocity experienced a π-pulse, exciting them to a state of complete inversion. However, due to the broad thermal velocity distribution of the atomic beam, a significant portion of the atoms were not completely inverted and entered the cavity in superposition states. In order to properly describe the resulting photon build-up, the micromaser theory of Filipowicz, P. et al., cited above, must be modified to include this feature.

The interaction of a single two-level atom with a single cavity mode can be described by the Jaynes-Cummings Hamiltonian, given by:

$$H = \frac{1}{2} \hbar\omega_a S_z + \hbar\omega a^\dagger a + \hbar g(S_+ a + S_- a^\dagger). \tag{1}$$

where g is the atom-field coupling constant:

$$g = \frac{\mu}{\hbar} \sqrt{\frac{2\pi\hbar\omega}{V_m}}, \tag{2}$$

and where $V_m$ is the mode volume of the cavity; $\hbar$ is Plank's constant divided by $2\pi$; $\omega_a$ is the atomic transition frequency; $a^\dagger$ and $a$ are the creation and the annihilation operators for the photons in the field mode respectively; and $S_+$, $S_{31}$ and $S_z$ are the Pauli spin matrices. When no atom is present in the cavity, the field density operator, $\rho^F$, undergoes decay due to cavity damping. Since the number of photons associated with black-body radiation even at room temperature is virtually zero in the microlaser ($n_b=10^{-28}$), the equation of motion is then simply:

$$\frac{d\rho^F}{dt} = -\frac{\Gamma_c}{2}(2a\rho^F a^\dagger - a^\dagger a \rho^F - \rho^F a^\dagger a), \tag{3}$$

where $\gamma_C$ is the cavity damping rate. If an atom enters the cavity at t=0 and exits at $t=t_{int}$, the field density matrix elements at time t, $0<t<t_{int}$, can be shown to satisfy the following recursion relation:

$$\rho_{n,m}^F(t) = \tag{4}$$

$$\rho_{n,m}^F(O)\{\rho_{aa}^A[C_n(t)C_m(t) + S_n^\delta(t)S_m^\delta(t) - i(C_n(t)S_m^\delta(t) - C_m(t)S_n^\delta(t))] +$$

$$\rho_{bb}^A[C_{n-1}(t)C_{m-1}(t) + S_{n-1}^\delta(t)S_{m-1}^\delta(t) + i(C_{n-1}(t)S_{m-1}^\delta(t) - C_{m-1}(t)S_{n-1}^\delta(t))]\} +$$

$$\rho_{n+1,m+1}^F(O)\rho_{bb}^A S_n^\kappa(t)S_m^\kappa(t) + \rho_{n-1,m-1}^F(O)\rho_{aa}^A S_n^\kappa(t) S_{m-1}^\kappa(t)$$

$$+ i\rho_{n,m-1}^F(O)\rho_{ba}^A(C_{n-1}(t) - iS_{n-1}^\delta(t))S_{m-1}^\kappa(t) - i\rho_{n-1,m}^F(O)\rho_{ab}^A S_{n-1}^\kappa(t)(C_m - 1(t) +$$

$$iS_{m-1}^\delta(t))$$

where $$\rho_{xy}^A \equiv c_x(O)c^*_y(O), \, x,y = a,b, \tag{5}$$

$$C_n = \cos\left[\frac{1}{2}\sqrt{\kappa_n^2 + \Delta^2} \, t\right],$$

$$S_n^\delta = \frac{\Delta}{\sqrt{\kappa_n^2 + \Delta^2}} \sin\left[\frac{1}{2}\sqrt{\kappa_n^2 + \Delta^2} \, t\right],$$

$$S_n^\kappa = \frac{\kappa_n}{\sqrt{\kappa_n^2 + \Delta^2}} \sin\left[\frac{1}{2}\sqrt{\kappa_n^2 + \Delta^2} \, t\right],$$

$$\kappa_n = 2g\sqrt{n+1},$$

and where $c_a(t)$ and $c_b(t)$ are the probability amplitudes of the atom in the upper and lower states, respectively, and $\Delta$ represents the atom-cavity frequency detuning. When no atom is present in the resonator mode, for example when $t>t_{int}$, the field decays to zero according to Equation 3. In terms of the elements of the density matrix, this Equation becomes:

$$\frac{d\rho_{n,m}^F}{dt} = \Gamma_c\left[\sqrt{(n+1)(m+1)} \, \rho_{n+1,m+1}^F - \frac{1}{2}(n+m)\rho_{n,m}^F\right]. \tag{6}$$

Equations 4 and 6 provide a general theoretical description of the microlaser.

Next, a reduced recursion relation combining Equations 4 and 6 is derived. The methods of Filipowicz et al., cited above, is employed perform an average over the random arrival times of atoms entering the cavity, and then invoke the boundary condition that the field density matrix repeats the same time evolution for every atom, once an equilibrium is reached. Denoting the field density matrix elements in the equilibrium state by $Q_{n,m}$ after averaging over random arrival times with mean time interval $\Delta t$, a reduced recursion relation is derived:

$$\left[1 + \frac{1}{2}\Gamma_c\Delta t(n+m)\right]Q_{n,m} = \tag{7}$$

$$Q_{n,m}\{N_a[C_nC_m + S_n^\delta S_m^\delta - i(C_nS_m^\delta - C_mS_n^\delta)] +$$

$$(1-N_a)[C_{n-1}C_{m-1} + S_{n-1}^\delta S_{m-1}^\delta + i(C_{n-1}S_{m-1}^\delta - C_{m-1}S_{n-1}^\delta)]\} +$$

$$Q_{n+1,m+1}[(1-N_a)S_n^\kappa S_m^\kappa + \Gamma_c\Delta t\sqrt{(n+1)(m+1)}] + Q_{n-1,m-1}N_a S_{n-1}^\kappa S_{m-1}^\kappa +$$

$$[Q_{n,m-1}(C_{n-1} - iS_{n-1}^\delta)S_{m-1}^\kappa + Q_{n-1,m}S_{n-1}^\kappa(C_{m-1} + iS_{m-1}^\delta) -$$

$$Q_{n,m+1}(C_n + iS_n^\delta)S_m^\kappa - Q_{n+1,m}S_n^\kappa(C_m - iS_m^\delta)]\sqrt{N_a(1-N_a)}$$

where $N_a$ is the probability that the atom is in the excited state when it enters the cavity, and $C_n$, $S_n^\kappa$ and $S_n^\delta$ are evaluated at $t=t_{int}$. Note that $Q_{n,m}$ is coupled to all of its nearest neighbors except $Q_{n-1,m+1}$ and $Q_{n+1,m-1}$. Once the field density matrix elements in the equilibrium state are evaluated using Equation 7, <n> can be calculated from:

$$<n> = \int_0^\infty dv f_B(v) \sum_{k=1}^\infty k Q_{k,k}(v), \tag{8}$$

where $f_B(v)$ is the Maxwell-Boltzmann velocity distribution function.

When the atoms are prepared in a superposition state, even if started from a vacuum state ($Q_{0,0}=1$), eventually all of the matrix elements become excited. Suppose that the first atom enters the cavity at t=0. According to Equation 7, just after the first atom-field interaction not only $Q_{1,1}$, and $Q_{0,0}$, but also $Q_{1,0}$ and $Q_{0,1}$ become nonzero. Interaction with a second atom will then excite any $Q_{n,m}$ with n,m=0,1,2. In general, all the $Q_{n,m}$ components with n,m=0,1, . . . , k become excited after interaction with the kth atom. This growth eventually tapers off due to cavity decay.

Now consider the spatial dependence of the atom-field coupling within the cavity. In the micromaser it is reasonable to assume that this coupling is spatially uniform, since a low-order standing-wave mode of the cavity is excited. Low order implies a cavity mode in which a few integer multiples of a half wavelength fit into the cavity. Since the wavelength is of the order of a few cm, it is relatively easy to align the atomic beam along the anti-node of the cavity mode, ensuring that all the atoms have the same coupling constant. In contrast, the microlaser employs an open optical resonator with high-order standing-wave modes. Typically $10^3$–$10^4$ wavelengths can fit into the cavity. Since the diameter of the atomic beam is typically much larger than the wavelength, the atom-field coupling constant varies sinusoidally along its width. In addition, since the cavity mode has a Gaussian field distribution in the transverse direction, the coupling constant also varies accordingly. Therefore, the coupling constant g appearing in Equation 4 via $C_n$, $S_n^k$, and $S_n^s$ becomes a function of the position $\vec{r}$ of the atom:

$$g(\vec{r}) = g_0 \exp\left[-\frac{x^2+y^2}{w_m^2}\right] \cos kz, \quad (9)$$

in which $g_0$ is given by $$g_0 = \frac{\mu}{\hbar}\sqrt{\frac{2\pi\hbar\omega}{V_m}}, \quad (10)$$

and z is the position of the atom along the axis of the resonator, and x and y are the transverse coordinates, with the beam of atoms moving along the x-axis. In Equation 9, $w_m$ is the waist of the cavity mode, and cos kz accounts for its standing-wave spatial variation with $k=2\pi/\lambda$.

The position dependence of the coupling constant can be taken into account by solving the recursion relation for $Q_{n,m}$, and then simply averaging over the distributions of y and z (variation in x is handled by $t_{int}$, which is independent of y and z). This averaging scheme would be correct only if the interaction between the atom and the field was independent of the interactions among the preceding atoms and the field. However, in the present case, one event of the atom-field interaction is not independent of the preceding events. The cavity field, which is the result of all preceding atom-field interactions, does not decay appreciably by the time the next atom arrives, and so influences the subsequent atom-field interaction.

In order to see that the post-averaging scheme is incorrect, consider a pair of infinitely narrow atomic beams of equal flux, both propagating parallel to the x-axis in the y=0 plane. A first beam A, passes through the field mode at a node ($\cos^2 kz=0$); the other, beam B, passes through an anti-node ($\cos^2 kz=1$). Note that the atoms passing through the node do not couple to the cavity field, and thus do not contribute to photon build-up in the cavity. In contrast, the atoms passing through the anti-node interact with the field with the full magnitude of the coupling constant, $g_0$. Assume that atoms from the two beams enter the cavity alternately, with $\Delta t_{whole}$ the average time interval between the arrival of successive atoms, one from beam A followed by one from beam B. The mean time interval between successive arrivals from a single beam is $2\Delta t_{whole}$. The post-averaging operation then results in an average of two configurations: atoms transversing either the anti-node or the node, each with 50% probability. Since the atomic beam intersecting the node does not interact, this averaging operation gives a mean photon number which is just half of the mean photon number that would be obtained from a single beam traversing the anti-node of the cavity with the mean time $\Delta t_{whole}$ between arriving atoms. Note that this is not the same as the correct mean photon number, which would be obtained from beam B alone, which has a mean time interval $2\Delta t_{whole}$ between arriving atoms. The two situations are not the same because in the microlaser, the mean photon number does not vary linearly with the time interval.

As a first-order correction to the theory needed to account for the standing-wave structure, it is assumed that half of the atoms are located in planes along the nodes of the cavity and the remaining half are located in planes along the anti-nodes. Then only the atoms located in the anti-node planes can interact with the cavity field, while the others pass through the cavity without interacting. This assumption is equivalent to counting only half of the atoms in the cavity. In fact, a second factor of two reduction in <N> occurs because the Gaussian transverse profile of the cavity mode. Therefore, only one quarter of the atoms in the apparent volume of the cavity are counted.

While <N> can be measured in the experiment, the parameter used in Equation 7 is not <N> but rather the mean time interval $\Delta t$ between successive arrivals, which is inversely proportional to <N>. As shown below, these two parameters are related by, $$<N> = \frac{t_{int}}{\sqrt{2\Delta t}}, \quad (11)$$

accounting for the standing-wave nature of the Gaussian profile of the cavity mode.

Figure 7:
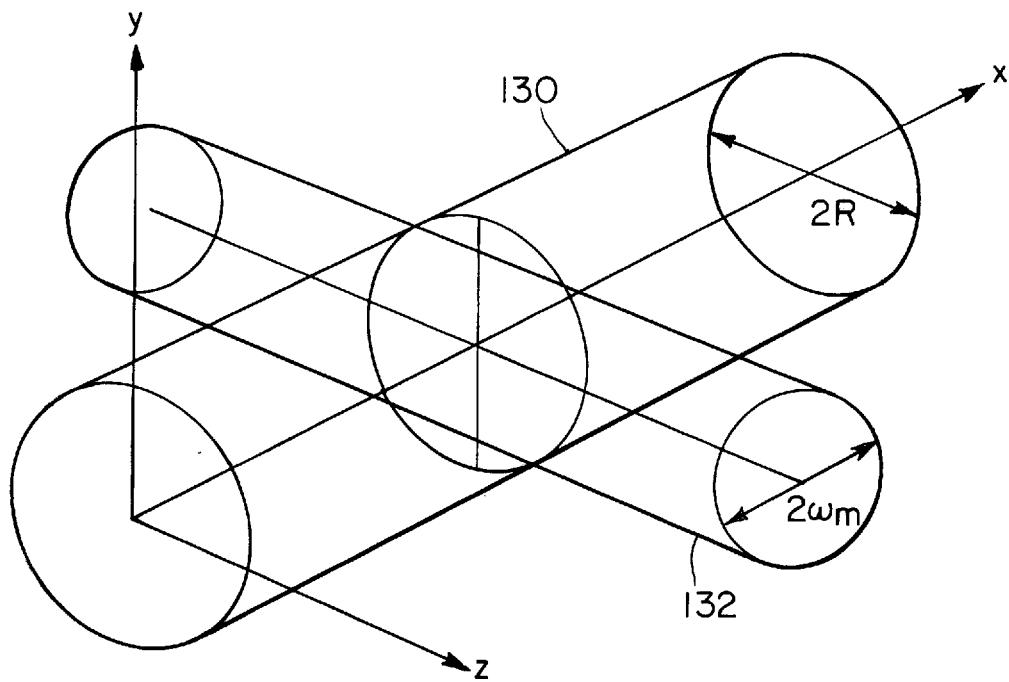
FIG. 7 is a perspective illustration of the intersection of an atomic beam and the cavity mode.

In order to explicitly show how the factor of one quarter arises, consider an atomic beam 130 of diameter 2R intersecting the cavity mode, as illustrated in FIG. 7. If the diameter 2R of the atomic beam 130 is smaller than the cavity length but much larger than the wavelength ($R\gg\lambda$), <N> can be calculated from the following integral:

$$<N> = \quad (12)$$

$$n_0 \int_{-\infty}^{+\infty} dx \int_{-R}^{R} dy \exp\left[-2\left(\frac{x^2+y^2}{w_m^2}\right)\right] \int_{-\sqrt{R^2-y^2}}^{\sqrt{R^2-y^2}} dz \cos^2 kz \cong$$

$$n_0 w_m \sqrt{\frac{\pi}{2}} \int R\, dy \exp\left(-\frac{2y^2}{w_m^2}\right) \int_{-\sqrt{R^2-y^2}}^{\sqrt{R^2-y^2}} dz \frac{1}{2} =$$

$$n_0 R^2 w_m \left(\frac{\pi}{2}\right)^{\frac{3}{2}} \eta(R/w_m),$$

where $n_0$ is the density of the atomic beam 130 which can be measured independently in the experiment, and $\eta(\zeta)$ is defined as:

$$\eta(\xi) = \frac{2}{\pi}\int_{-1}^{1} dq \sqrt{1-q^2}\, \exp(-2q^2\xi^2). \quad (13)$$

Note the approximation in Equation 12 that the standing-wave spatial variations are so rapid across the atomic beam 130 that $\cos^2 kz \cong \frac{1}{2}$. The function $\eta(\zeta)$ can be expressed in simple form in two limiting cases. When $R \ll w_m$, $$\eta(R/w_m) \approx \frac{2}{\pi}\int_{-1}^{1} dq \sqrt{1-q^2} = 1, \quad (14)$$

and when $R \gg w_m$, $$\eta(R/w_m) \approx \frac{2}{\pi}\int_{-1}^{1} dq \exp[-2(R/w_m)^2 q^2] \approx \sqrt{\frac{2}{\pi}}\frac{w_m}{R}. \quad (15)$$

Therefore, $$<N> = \begin{cases} n_0 \frac{1}{4}\pi R^2 (2w_m) \frac{\sqrt{\pi}}{2} & \text{if } R < w_m, \\ n_0 \frac{1}{4}\pi w_m^2 (2R) & \text{if } R > w_m. \end{cases} \quad (16)$$

The physical meaning of this result is as follows. When $R \gg w_m$, the averaging occurs over the $\cos^2 kz$ dependence, as well as over the Gaussian mode profile along x and y directions. Therefore, in order to obtain <N>, the mean number of atoms in the apparent volume, $\pi w_m^2(2R)$, must be multiplied by an overall reduction factor:

$$\frac{1}{2} \times \frac{1}{\sqrt{2}} \times \frac{1}{\sqrt{2}} = \frac{1}{4} . \tag{17}$$

On the other hand, if $R \ll w_m$ it is not necessary to average over y, so that the reduction factor is then $$\frac{1}{2} \times \frac{1}{\sqrt{2}} = \frac{1}{2\sqrt{2}} , \tag{18}$$

which is multiplied by an apparent volume of $\pi R^2 \sqrt{\pi} w_m$. Note that $\sqrt{\pi} w_m$ is used instead of $2w_m$ because of the Gaussian variation along the x direction.

In a similar way, the relation between <N> and $\Delta t$ can be derived. For this, consider an infinitely narrow atomic beam 130 ($R \ll w_m$, $\lambda$) traveling along one of the anti-nodes of the cavity. We assume that the mean time interval between atoms entering the cavity is $\Delta t$. The density is then simply $$n_o = \frac{1}{\pi R^2 v \Delta t} . \tag{19}$$

Since all the atoms are moving along the anti-node, $$<N> = n_o \frac{1}{\sqrt{2}} \pi R^2 \sqrt{\pi} \ w_m, \tag{20}$$

without the factor ½ (no averaging over z). Using the expression for the density:

$$<N> = \frac{1}{v \Delta t} \frac{1}{\sqrt{2}} \sqrt{\pi} \ w_m = \frac{\sqrt{\pi} \ w_m / v}{\sqrt{2} \ \Delta t} . \tag{21}$$

The result for N infinitely narrow atomic beams traveling along the anti-nodes of the cavity can be generalized. In this case, the mean time interval becomes $\Delta t / N \equiv \Delta t_{whole}$, but the result is the same as Equation 17 except for $\Delta t$ replaced with $\Delta t_{whole}$.

For a known value of <N>, the mean time interval given by this equation can be used in the recursion relation, Equation 7. With this simple substitution, the y and z spatial dependences of the coupling constant are taken into account in an approximate way. For Gaussian mode functions, the appropriate atom-field interaction time to be used is:

$$t_{int} \equiv \frac{\sqrt{\pi} \ w_m}{v} . \tag{22}$$

Using this value of $t_{int}$, Equation 21 can be rewritten in a simple form:

$$\Delta t = \frac{t_{int}}{\sqrt{2} \ <N>} , \tag{23}$$

as stated in Equation 11.

Data from microlaser measurements is shown in FIG. 2A. The curve denoted by present theory 63 is obtained from the recursion relation, Equation 7, using Equations 16 and 11 to express the average number of atoms. This theory takes into account that a significant portion of the atoms entering the cavity are excited to superposition states in the microlaser, thereby inducing non-zero off-diagonal field matrix elements. It also incorporates the velocity distribution of the atomic beam (i.e., the results were averaged over this velocity distribution using Equation 8). For comparison, the prediction of the micromaser theory 60 of Filipowicz et al., cited above (micromaser theory) is also presented, for which the number of thermal photons was sent equal to zero ($n_b=0$), and the results averaged over the velocity distribution. As mentioned above, the micromaser theory assumes that the off-diagonal elements of the field density operator all vanish. As can be seen, the value of <n> predicted by micromaser theory 63 is smaller than the actual signal by about factor of two, even for small <N> and <n>. The agreement between the measurement data 61 and the present theory 63 is good where <N> and <n> are much less than one. When <n> becomes much larger than unity however, theory 63 and measurement 61, 62 do not agree. The results indicate a rapid change in the slope near <N>≅0.6, well before the single atom interaction approximation becomes invalid (probability for more than one is 13% for <N>=0.6. This rapid rise can be explained by the standing-wave nature of the cavity mode, as described above.

In reality, atoms are distributed throughout the standing-wave structure of the cavity mode, those near the anti-nodes experiencing maximum coupling strength, whereas those near the nodes experience no coupling at all. The above calculation makes the simplifying assumption that half of the atoms are at the nodes, with the remaining half at the anti-nodes. This is a good approximation as long as the number of photons in the cavity mode is relatively small, as confirmed by the good agreement with the experimental data. However, the approximation breaks down then the photon number begins to grow large. In that case, even the atoms near the nodes can interact with the cavity field, mostly generated by atoms traveling near the anti-nodes. For atoms near the nodes, even though coupling is reduced by the cos kz function, the Rabi frequency that governs photon emission from the atoms is increased by the factor $\sqrt{n+1}$, with photon number n much larger than one. Accordingly, except for the atoms traveling exactly along the nodes, essentially all of the atoms can participate in the photon emission process. The upper bound of <n> caused by this saturation effect should be what we would find if the coupling did not vary sinusoidally along the cavity axis, and if all the atoms assumed the full strength of the coupling constant. In this case, the number of atoms contributing to laser oscillation is simply doubled.

In FIG. 2B, the data 61, 62 are compared with the curve 64 indicating the upper bound of <n> based on this argument. Note that in our data the rapid change in slope occurs when <n>~3, which is certainly large enough for the onset of the saturation effect. This upper bound argument hence gives insight into the rapid increase in <n>. There still exists a discrepancy between the data and the theory when <N>≈1. In this case an effective number of atoms contributing to laser oscillation, $N_{eff}$, can be as large as twice <N>, since saturation is fully effective. It is suspected that the discrepancy occurs since more than one atom interacts simultaneously with the cavity field with significant probability (~60% for $N_{eff}$≈2), invalidating the present one-atom quantum theory. Few quantum mechanical treatments of the micromaser with a few atoms in the cavity have appeared, and a complete theory has yet to be developed.

The FM locking technique for eliminating frequency jitter and for locking the frequency to the atomic transition will now be described. Optical frequency modulation or "FM" spectroscopy has been widely used since its inception in 1980. When combined with saturation spectroscopy, it becomes a Doppler-free technique, capable of high resolution. The principle of FM spectroscopy is best understood by noting that frequency modulation of a probe laser generates two side bands in the probe spectrum with opposite phases. If the modulation frequency, $\omega_m$, is much larger than characteristic spectral structure, the FM spectroscopy can map out two features of the spectral structure, absorption and dispersion. If one of the sidebands is tuned near the structure, a transmitted signal intensity is then simply:

$$I(t)=I_o e^{-2\bar{\delta}}[1 \mp \Delta\delta M \cos \omega_m t + \Delta\phi M \sin \omega_m t] \quad (24)$$

where M is the modulation depth and $\bar{\delta}$ is the off-resonance absorption. $\bar{\delta}$ can be considered as a baseline relative to which absorption $\Delta\delta$ and dispersion $\Delta\phi$ are measured. The $\mp$ sign in the above equation corresponds to the $\Omega \pm \omega_m$ sideband, respectively, with $\Omega$ the center frequency of the probe laser. It then becomes apparent that the absorption or dispersion coefficient can be selectively measured by employing phase-sensitive detection, in which the detected signal is multiplied by $\cos\omega_m t$ or $\sin\omega_m t$ and averaged over a period of $1/\omega_m$. In the experiment, the phase-sensitive detection is electronically performed by means of a balanced mixer. Frequency modulation is achieved using an electro-optic modulator (EOM) driven by a local oscillator (LO), for example a function generator. The signal transmitted by the sample is measured with a fast detector, the bandwidth of which is much larger than the modulation frequency. The detected signal is sent to the RF (radio frequency) input of a balanced mixer, where it is mixed with the LO signal. The resulting signal has frequency components at $2\omega_m$ and DC. The $2\omega_m$ component is rejected by the mixer, and only the DC component is available at its IF (intermediate frequency) output. The sine or cosine quadrature can be selected by controlling the relative phase between the RF and LO input signals.

In a Lamb dip measurement, overlapping, counter-propagating pump and probe beams having the same frequency traverse an atomic (or molecular) vapor cell. The atoms in the cell have a Maxwell-Boltzmann velocity distribution. The pump laser saturates the group of atoms whose velocity component along the laser beam axis, $v_+$, satisfies $\omega_0 + kv_+ = \Omega$, where $\Omega$ is the frequency of the laser and $\omega_0$ is the center frequency of the atomic transmission of interest. The opposite-propagating probe will then be resonant with a velocity group satisfying $\omega_0 - kv_- = \Omega$. Since $$v_+ = -v_- = \frac{\Omega - \omega_0}{k},$$

the two velocity groups do not share common atoms if $\Omega \neq \omega_0$, so the probe laser will sample the unsaturated absorption profile of the vapor sample. However, if $\Omega$ is tuned to $\omega_0$ within the homogeneous linewidth of the velocity group, the probe will interact with the same velocity group, i.e., atoms with zero velocity component, as the pump laser does. Since the intense pump laser depletes the ground state population of the zero-velocity group by exciting the atoms to the upper level of the atomic transition, the probe laser interacts with fewer ground state atoms, and therefore, its intensity will be attenuated less. This saturation effect results in a narrow dip in the broad absorption profile. The linewidth of the dip is the homogeneous linewidth.

The barium vapor cell used in the experiment was made of ¾" stainless steel tubing. The length of the cell was about 30 cm, and both ends had windows. The central portion of the cell, 5 cm long, was heated to 680° C. by a non-contact cylindrical heater surrounding the cell. The heater had nichrome wires wound in a zig-zag pattern so that the stray magnetic field inside was minimized. The vapor pressure was a few mTorr, at which the collisional broadening was in the order of 10 kHz. The $^1S_0 \leftrightarrows\, ^3P_1$ transition of atomic barium at 791 nm was used. This transition has a 50 kHz natural linewidth. Nevertheless, the linewidth of the Lamb dip was about 2 MHz. A slight misalignment (_<0.5 mrad) between the pump and probe laser beams contributed a inhomogeneous broadening of 0.5 MHz to the measured linewidth. However, most of this broadening was due to power broadening of the transition by the pump laser. In fact, the homogenous linewidth could be set to any desired value by adjusting the pump laser intensity. A typical pump intensity was 10 mW, resulting in a Lamb-dip linewidth of 2.5 MHz.

FM spectroscopy can be used to map out not only the absorption lineshape of a spectral line, but also its dispersion lineshape. The Lamb dip itself can be thought of as a spectral line. Therefore, if the probe in the Lamb dip measurement is replaced by a frequency-modulated laser beam while keeping the pump laser unmodulated, a dispersion lineshape of the Lamb dip is obtained. For this the modulation frequency is adjusted to be much smaller than the Doppler linewidth but much larger than the homogeneous linewidth of the dip. Since the FM signal is proportional to the difference between the absorption coefficient at one sideband and the absorption at the other sideband, the signal is very small if the sidebands are not resonant with the Lamb dip transition. Therefore, the FM signal does not contain the broad Doppler profile. Only the dispersion or absorption lineshape of the Lamb dip is revealed.

In a preferred embodiment, an EOM (INRAD 651-254) driven by a quartz-tuned function generator (Stanford Research DS-3100) at 25 MHz was used. The FM signal was measured by means of a silicon photodiode (EG&G FND100), which was biased at −90 V to have a rise time of 2 ns with 50 $\Omega$ impedance. The current from the photodiode was directed to the RF port of a balanced mixer (VARI-L CM-4). As discussed before, depending on the phase of the local oscillator signal relative to that of the FM signal, either a dispersion lineshape or an absorption lineshape can be selected from the FM signal. In order to adjust the phase difference, we varied the length of the BNC cable connecting the function generator and the LO port of the mixer. Since the speed of light in a BNC cable is $2\times10^8$ m/s, a $2\pi$ phase change is obtained by the length change of $$\frac{2 \times 10^8 \text{m/s}}{25 \text{ MHz}} = 8\text{m}.$$

The output at the IF port of the mixer was amplified by a homemade DC amplifier and then displayed and digitized on a digital scope (Lecroy 9310M). FIG. 5 shows a typical FM Lamb-dip signal as a function of the laser-atom detuning $(\Omega - \omega_0)$. The curve consists of three dispersive resonances at $\Omega = \omega_0, \omega_0 \pm \omega_m/2$.

The dispersion lineshape of the Lamb dip shown in FIG. 5 was measured as a function of the laser-atom detuning. The central straight segment of the curve, where the FM signal is directly proportional to the difference between the laser and atom frequency is of particular interest. Therefore, the laser can be stabilized as well as locked relative to the atom by reducing the error signal. This reduction can be done in real time by forming a negative feedback loop composed of the laser, the Lamb-dip setup, and an amplifier for the FM signal with a properly chosen polarity.

The laser system used in a preferred embodiment (Coherent 899-21) has a reference cavity to which the laser frequency was locked. An error signal generated by the reference cavity was processed by the laser control box to provide the necessary voltage signals for the frequency-correcting elements in the laser head. There are two such elements with different bandwidths, a tipping plate driven by a galvo drive (DC to 100 Hz) and a tweeter mirror driven by a PZT (0.1 Hz to 10 kHz). The control circuitry includes a cross-over network to generate drive signals with proper bandwidth for these elements.

The laser could be locked to the atom simply by substituting the error signal from the reference cavity with the FM Lamb-dip signal. The control box was still utilized for the signal processing. A homemade amplifier circuit was used as a pre-amplifier for the FM signal, also providing correct polarity for the required negative feedback. The FM signal was amplified by the circuit to a voltage level comparable to that of the error signal from the reference cavity. In this way, the FM signal, fed to a differential amplifier in the control box, was set to the proper input range (~50 mV RMS). The frequency range of the straight segment 102 in the FM Lamb-dip signal was identical to the homogeneous linewidth of the Lamb dip, about 2.5 MHz. The peak-to-peak height of the segment was 250 mV. Hence, the slope of the straight segment 102 was 10 kHz/mV.

With a switch box, the source of the error signal could be chosen to be either the reference cavity or the FM Lamb-dip signal. When the reference cavity was used for locking, the laser slowly drifted away from the resonance even if the laser was initially set at the atomic resonance. Furthermore, due to random fluctuations in the laser frequency, the FM signal swung up to the full height of the straight segment, indicating a frequency deviation of up to 2–3 MHz. This large fluctuation was mostly at low frequencies ($_{<}$10 Hz), and its source appeared to be the reference cavity. The FM signal also had underlying fast frequency components ($_{>}$100 Hz), but their amplitudes were about 30 mV RMS, corresponding to excursions of 300 kHz RMS. These fluctuations were greatly reduced when the FM Lamb-dip signal was used in the feedback loop instead of the reference cavity signal. When the laser was locked to the atomic resonance, the size of the FM error signal was about 15 mV RMS, corresponding to frequency fluctuations with an excursion of 150 kHz RMS. These fluctuations, however, were regular, mostly at 660 Hz. It was later found that this frequency was associated with the mechanical resonance of the galvo-driven tipping plate in the laser head. Except for this frequency component, the size of the FM error signal was 5 mV RMS, resulting in an excursion of 50 kHz RMS.

Figure 5A:
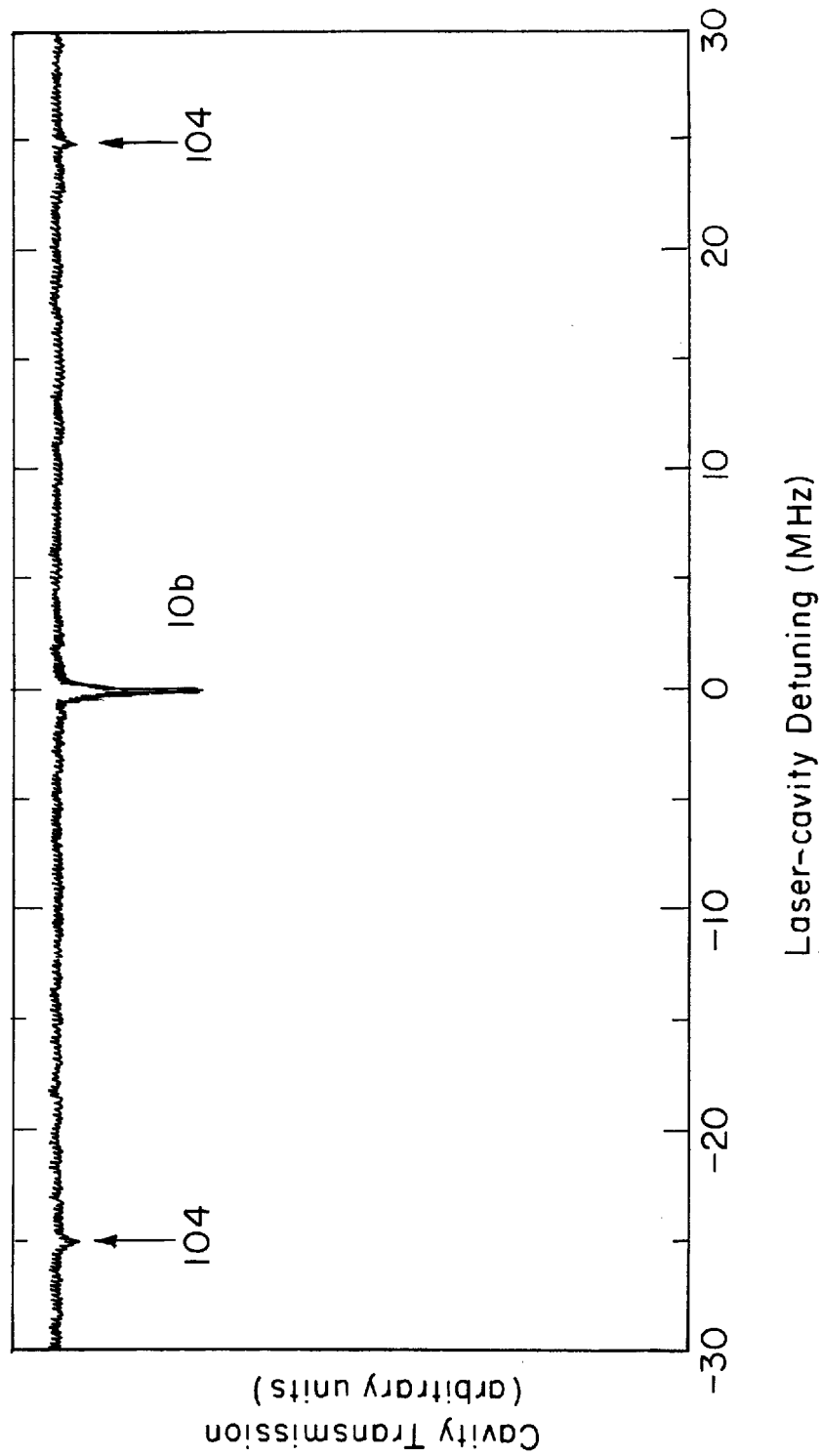
FIGS. 5A and 5B illustrate a typical cavity transmission signal as a function of laser-cavity detuning.
Figure 5B:
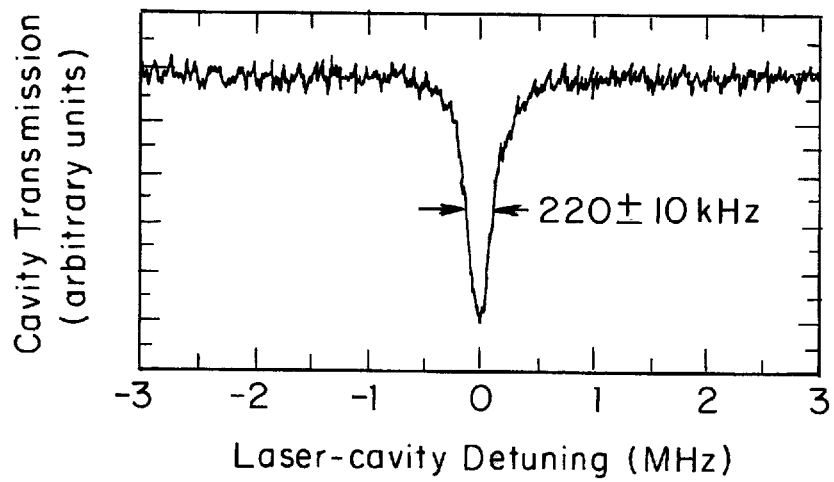

FIGS. 5A and 5B show the spectrum of this frequency-stabilized laser probed by a scanning Fabry-Perot spectrum analyzer with a FWHM of 110 kHz, which was measured independently with the ring-down technique of Rempe et al., cited above. The Fabry-Perot was scanned fast enough so that the laser fluctuations at 660 Hz did not affect the measurement. The two peaks 104 on the side are frequency modulation sidebands at 25 MHz. These sidebands actually serve as frequency markers for calibrating of the frequency scale. The linewidth of the central peak 106 is 220 kHz. Since the resonator linewidth was 110 kHz FWHM for this measurement, the contribution from the laser was 110 kHz or 55 kHz RMS, which is consistent with the estimate based on the FM error measurement.

Figure 6:
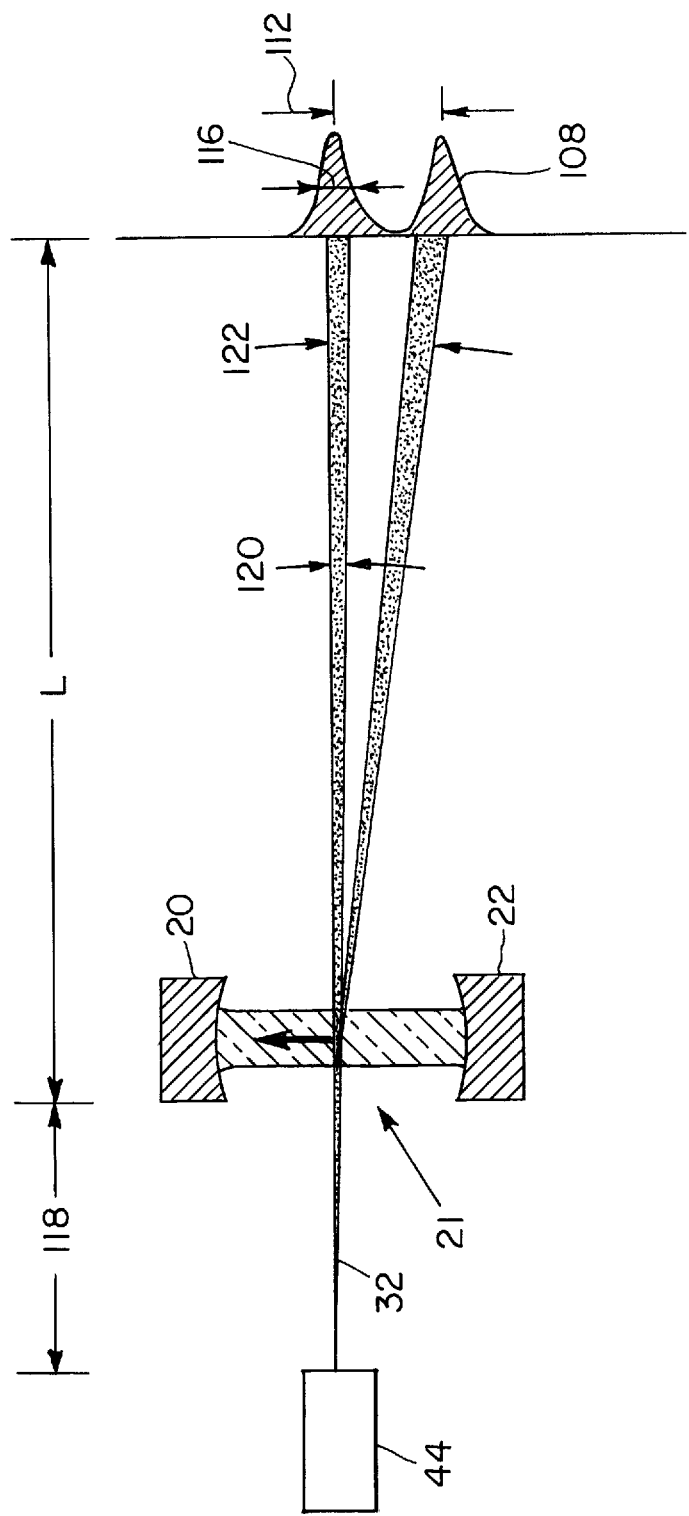
FIG. 6 is a schematic representation of an experimental embodiment for demonstrating entanglement between the quantized Rabi oscillations and the mechanical degrees of freedom of microlaser atoms.

In the microlaser, the internal atomic states and the atomic motion can be correlated. One such correlation is the entanglement between the transverse momentum of the atom 34 traversing the cavity 21 and the quantized Rabi oscillations. In the traveling-wave cavity, if an excited atom traversing the cavity emits a photon into the cavity mode, the atom acquires a recoil momentum directed opposite that of the emitted photon, deflecting its trajectory. However, if the same atom reabsorbs a photon from the field before it exits the cavity, the net momentum change is zero and the atom will not be deflected. Note that there are only two possible values of the net momentum transfer, zero or that of a single photon recoil. If we repeatedly measure the transverse displacement of atoms exiting the cavity as a function of parameters such as <N> and $T_{int}$, and plot the number of occurrences as a function of the displacement, a two-peak distribution 108, 110 will be obtained as shown in FIG. 6. The relative size of the peaks 108, 110 will depend on the photon number distribution of the intra-cavity field, as well as the atom-field interaction time. Such measurements provide a nondestructive means to probe the nonclassical distribution of the cavity photons.

FIG. 6 is a schematic representation of an embodiment for measuring entanglement between the quantized Rabi oscillations and the mechanical degrees of freedom of microlaser atoms, using the $^1S_0$-$^3P_1$ transition of atomic ytterbium ($^{174}$Yb) at λ=556 nm. A cavity 21 with a finesse of 1 million and a length of 0.8 mm is employed. The key parameters are: g/2π=480 kHz, $γ_p$/2π=94 kHz, $γ_c$/2π=94 kHz; so that the first zero-photon trapped state will occur at a velocity of 57 m/s. Consider an atomic beam 32 with a longitudinal velocity of 57 m/s and a half-angle divergence of 10 μrad (divergence 120 of 20 μrad), corresponding to a transverse velocity spread of ~0.6 mm/s. (Such a beam divergence can be achieved with two 30 μm beam apertures separated by 1.5 m.) On the other hand, at this wavelength, recoil of a single photon changes the transverse velocity by ~4.3 mm/s, which is much larger than the transverse velocity spread. If the atoms are detected at a length L of 1.5 m downstream from the cavity 21, the spatial separation 112 between the two beams will be 110 μm with a radial separation 122 of 75 μrad, compared to the 60 μm full width 116 of each beam. Note that a fairly large oven-to-cavity distance 118 and relatively small atomic beam apertures are necessary to achieve this very small atomic beam divergence. As a result, the atomic density in the cavity 21 would be quite small if a mechanical velocity selector was used to select slow atoms from an effusive beam source. Instead, laser techniques are employed to slow and compress the Yb atomic beam 32 increasing the usable density of slow atoms. Atomic barium, on the other hand, is difficult to slow in this way (at λ=553 nm) because of appreciable branching of the $^1P$ state to the long-lived $^{3,1}D$ states. This is why ytterbium is more appropriate for this embodiment.

Atom-field entanglement is also useful for measuring vacuum Rabi oscillations, complementing the measurement of the microlaser emission spectrum in the fluorescence regime. If, for example, only half a period of the vacuum Rabi oscillation can occur as atoms traverse the cavity ($gT_{int}$≈π/2) lineshape splitting does not provide as clear a signature of the vacuum Rabi oscillation as in the case of more than one complete oscillation. However, this oscillation is demonstrated in the change in atomic transverse momentum resulting from the atom-vacuum field interaction. In addition, atom-field entanglement is also useful for measuring the fluctuations in the number of the deflected/undeflected atoms at a fixed interaction time, since such fluctuations are strongly correlated with fluctuations in intra-cavity photon number. It is interesting to note that in the micromaser, the cavity field statistics are studied by probing the internal states of the atoms exiting the microwave cavity, whereas in the present invention, an external degree of freedom (momentum) is utilized.

When a microlaser operates in the one-photon limit, splitting in the atomic fluorescence spectrum occurs. This splitting is termed the vacuum-field Rabi splitting, since it originates from the Rabi oscillation due to the vacuum field in the cavity, in which an initially excite atom can undergo pendulum-type cycles for de-excitation and excitation, exchanging a quantum of energy with the vacuum field many times. This Rabi splitting is closely related to the splitting observed in a recent cavity QED experiment which studied the transmission of a high-Q resonator containing a weakly excited atom. This latter splitting is a manifestation for small amplitude energy exchange between the cavity field and the atom, responding in the harmonic oscillator limit. It is purely sinusoidal, as opposed to the pendulum-type motion which is characteristic of atom-filed energy exchange in the large amplitude limit.

In order to measure this splitting behavior the atom and cavity decay rates $2\gamma_p$ and $2\gamma_c$, respectively, can be made much smaller than the atom-field coupling constant, g, and the atom-field interaction time, $T_{int}$, must be long enough to satisfy $gT_{int} \gg 1$, but with $\gamma_p T_{int}$ and $\gamma_c T_{int} < 1$. Furthermore, the time interval between atoms entering the resonator must be much larger than the cavity decay time, in order that each atom-field interaction be independent of the preceding one. In this limit, referred to as the (strong-coupling) fluorescence regime hereafter, at most a single photon can be stored in the cavity (most of the time it is empty). Individual atoms are assumed to be completely inverted prior to entering the cavity, and an expression for the atomic fluorescence spectrum has been derived. The microlaser output emission spectrum will exhibit this same vacuum Rabi splitting. Since in this regime only one photon, at most, is present in the cavity at any time, the cavity field undergoes oscillations between vacuum and one-photon states as the atom undergoes Rabi oscillations. This is not true in the opposite limit, referred to below as the (strong coupling) laser regime, in which successive excited atoms enter the cavity before the field generated by the previous atoms decay away, so that a cavity field of many photons can build up.

In the fluorescence regime the microlaser emission spectrum exhibits vacuum Rabi splitting, whereas in the laser regime a Lorentzian emission lineshape is predicted. This behavior can be attributed to the phase memory of the long-lived cavity field, which permits transfer of phase information from one atom to the next, and thus determines the emission lineshape. It can also be understood from consideration of the field dynamics. In the laser regime, in which many photons are stored in the cavity, single photon emission and absorption by an atom traversing the cavity has little impact on the field strength. Since the cavity field does not exhibit significant oscillatory behavior, the corresponding emission spectrum does not exhibit splitting.

The interaction time $T_{int}$ can be increased by replacing the current effusive thermal atomic beam with a beam of slow atoms, produced by means of a Fizeau-type velocity selector. Completely inverted barium atoms ($^1S_0 \rightarrow ^3P_1$ at 791 nm) can be introduced into the cavity at around v=60 m/s with $\Delta v/v \approx 0$. An optical cavity is employed with a mirror separation and finesse of 200 $\mu$m and 2 million, respectively, so that the experimental parameters are $(g, \gamma_p, \gamma_c)/2\pi = (840, 25, 190)$ kHz and $T_{int}=0.9$ $\mu$s, and hence $gT_{int} \approx 5$, i.e., more than one complete Rabi cycle will occur as an excited atom traverses the cavity mode. The emission spectrum is then measured for various mean number of atoms in the cavity, <N> (up to unity). Note that in these measurements <N> (or, equivalently, the time interval between successive atoms) can be varied while the velocity of injected atoms (hence $gT_{int}$) is kept constant. In this way one can measure the evolution of the emission spectrum from the vacuum Rabi splitting the fluorescence regime to a single-peaked lineshape in the laser regime.

Using the parameters referenced, nonclassical microlaser radiation can be generated if the velocities of the injected atoms are controlled with sufficient precision ($\Delta v/v \leq 0.1$). Of particular interest is the photon-number trapped state of a microlaser. If $gT_{int}\sqrt{n+1}=m\pi$ for all atoms, m an integer, then the field will evolve to an n-photon trapped state. In this case an excited atom entering the cavity undergoes exactly m complete Rabi oscillations and then exit the cavity in its initial state of excitation. In particular, if n is zero, the cavity field can never build up (zero-photon trapped state).

To measure microlaser trapped states, a narrow-velocity beam of completely excited atoms can be employed, and microlaser emission is monitored as the atomic velocity is varied. Since $T_{int}$ is inversely proportional to the velocity, the scan parameter is essentially $gT_{int}$. As beam velocity is varied, the density of atoms is simultaneously adjusted in such a way the <N> is fixed throughout the scan. Three microlaser output parameters can be measured: the output power (via direct photon counting), the emission spectrum (via a variable-delay interferometer), and the intra-cavity photon number distribution function (via free-induction decay photon counting).

Figure 8A:
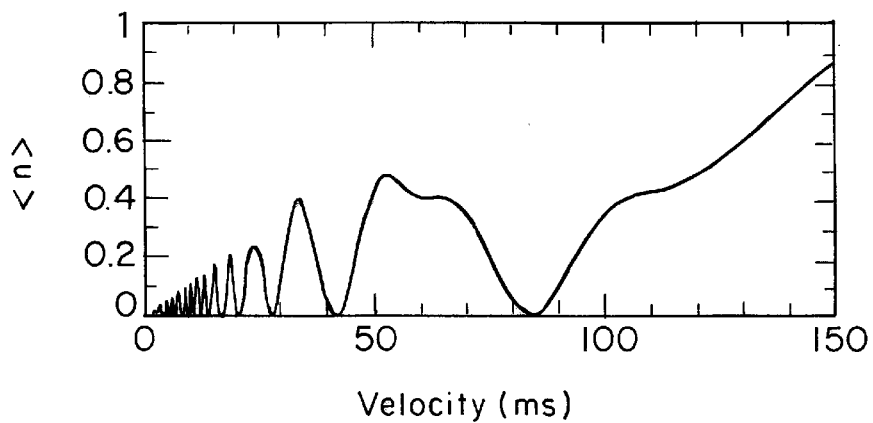
FIGS. 8A–8C depict numerical estimates of microlaser output parameters as a function of atomic velocity, for the case of the 791 nm atomic barium transition with a cavity finesse of 2 million and a cavity length of 200 $\mu$m. The simulations employed the fully quantized micromaser theory with blackbody photon number set to zero.
Figure 8B:
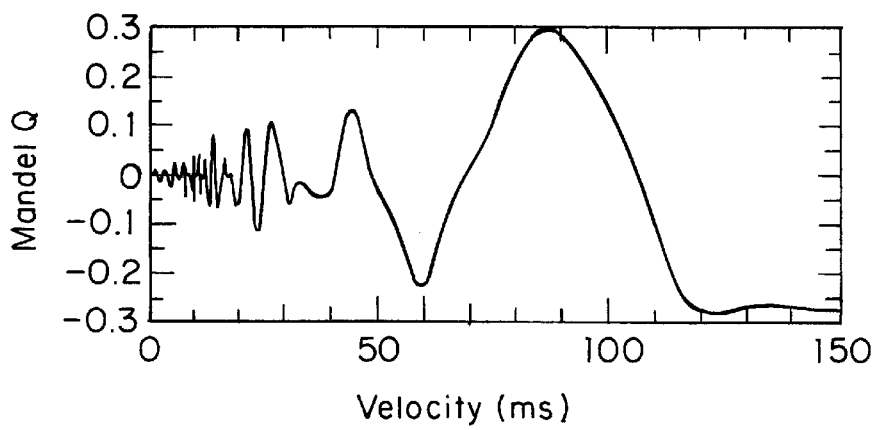
Figure 8C:
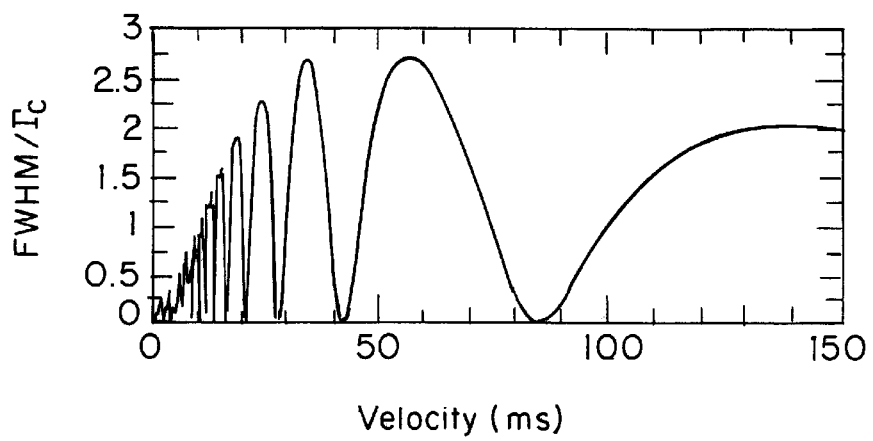

Such an experiment is numerically depicted in FIGS. 8A–8C for the 791 nm barium transition, where cavity finesse and mirror separation are assumed to be 2 million and 200 $\mu$m, respectively (Table 1), leading to values of $(g, \gamma_p, \gamma_c)/2\pi = (840, 25, 190)$ kHz. Note that $2gT_{int}$ equals $2\pi$ (one complete vacuum Rabi oscillation) when v~84 m/s. The intra-cavity field vanishes when $gT_{int}=m\pi$ in FIG. 8A, resulting in zero-photon trapped states.

Also shown in FIG. 8C is the estimated emission linewidth as a function of atomic velocity. Note that the linewidth broadens whenever the photon statistics exhibit a sub-Poissonian number distribution, signifying that phase and number are conjugate variables.

Notice that around a velocity of 60 m/s, a one-photon trap state can be generated with a significate sub-Poissonian photon number distribution, i.e., the Mandel Q parameter is –0.25 (FIG. 8B). Interestingly, although the existence of the one-photon trapped state is not very clear in the emitted power, its statistical signature is unmistakable in Q. A simple method for measuring the intra-cavity photon number distribution function via direct photon counting of the free-induction decay of the cavity field provides a direct measurement the intra-cavity photon number distribution function in the trapped state. For this measurement the microlaser is turned on and the cavity photons allowed to come to equilibrium. The microlaser is then turned off, and photons undergoing free decay from the cavity will be collected for several cavity decay times. This on-off sequence can be repeated until a statistically large number of counts is accumulated. The photon counting distribution can be obtained and consequently the probability of counting a given number of photons during a given time interval can be determined.

Although the present invention and its advantages have been described in detail, it should be understood that various changes, substitutions and alterations can be made herein without departing from the spirit and scope of the invention as defined by the appended claims.

We claim:

1. A method for generating coherent radiation in an optical spectral region comprising the steps of:

providing an optical cavity between a pair of reflectors;

exciting a plurality of particles from a lower energy level to an upper energy level;

injecting the individual excited particles into the cavity in sequence, such that the particles undergo a transition in energy from the upper level to the lower level to provide an average number of particles in the cavity that is less than one and an average number of photons in the cavity that is greater than one; and emitting coherent radiation in the optical spectral region from the cavity.

2. The method of claim 1 further comprising the step of controlling the particles injection rate so that the mean number of particles in the cavity at any given time is less than one.

3. The method of claim 1 wherein the step of exciting particles includes exciting a plurality of atoms with an optical pump.

4. The method of claim 1 further comprising the step of stabilizing the optical cavity by monitoring movement of the mirrors and adjusting the position of the mirrors in response to the movement.

5. The method of claim 1 further comprising the step of sensing photons emitted from the cavity.

6. The method of claim 1 further comprising the step of coupling the emitted radiation to a fiber optic.

7. The method of claim 1 wherein each particle transits the cavity in less than one microsecond.

8. The method of claim 1 wherein the particles comprise atoms selected from the group of atoms consisting of: barium, cesium, and ytterbium.

9. The method of claim 1 further comprising inducing Rabi oscillation in the cavity.

10. The method of claim 1 further comprising exciting the particles with an optical pump, the optical pump having a frequency locked to an energy transition of the particles.

11. An apparatus for generating laser radiation in an optical spectral region comprising:

a pair of opposed reflectors defining a high-finesse optical cavity therebetween;

a source that delivers particles into the cavity;

a plurality of the particles, each individual particle being excited from a lower energy level to an upper energy level and injected into the cavity, the cavity geometry being substantially matched to the energy transition between the upper level and lower level such that upon sequential entry of a plurality of particles into the cavity, the average number of particles in the cavity being equal to or less than one; and an exit aperture through which laser radiation in the optical spectral region is emitted from the cavity.

12. The apparatus of claim 11 further comprising an actuator that controls a relative position of the reflectors and a circuit to electrically actuate the actuator.

13. The apparatus of claim 11 further comprising a detector that senses radiation emitted by the cavity.

14. The apparatus of claim 11 further comprising a fiber optic device optically coupled to the cavity.

15. The apparatus of claim 11 further comprising an optical pump to excite the particles from the lower energy level to the higher energy level.

16. The apparatus of claim 15 wherein the optical pump has a frequency that is locked to an energy transition of the particles.

17. The apparatus of claim 15 further comprising cavity tuning means for controlling a frequency of the optical pump.

18. A method for measuring coherent radiation in an optical spectral region comprising the steps of:

providing an optical cavity between a pair of reflectors;

providing a detector that is optically coupled to an exit aperture of the optical cavity;

providing a source of a plurality of atoms at an upper energy level;

injecting the individual excited atoms into the cavity in sequence, such that the atoms undergo a transition in energy from the upper level to a lower level such that there is an average number of atoms in the cavity is less than one; and coupling coherent radiation in the optical spectral region from the cavity to the detector.

19. The method of claim 18 further comprising the step of controlling the atom injection rate so that the mean number of atoms in the cavity at any given time is less than one.

20. The method of claim 18 further comprising exciting the atoms with an optical pump before injecting the atoms into the optical cavity.

21. The method of claim 18 further comprising providing a high-finesse optical cavity and stabilizing the high-finesse optical cavity by monitoring movement of the reflectors and adjusting the position of the reflectors in response to the movement.

22. The method of claim 18 further comprising providing actuators to control movement of at least one reflector.

23. The method of claim 18 wherein the atoms are selected from the group consisting of Barium, Cesium and Ytterbium.

24. The method of claim 18 further comprising measuring the emission spectrum of light from the cavity.

25. A method for generating coherent radiation in an optical spectral region comprising the steps of:

providing an optical cavity between a pair of reflectors;

exciting a plurality of particles from a lower energy level to an upper energy level with an optical pump, the optical pump having a frequency corresponding to an energy transition of the particles;

injecting the individual excited particles into the cavity in sequence, such that the particles undergo a transition in energy from the upper level to the lower level to provide an average number of particles in the cavity that is less than one and an average number of photons in the cavity that is greater than one; and emitting coherent radiation in the optical spectral region from the cavity.

26. The method of claim 25 further comprising the step of measuring a frequency of a probe and generating a feedback signal.

27. The method of claim 26 further comprising measuring a lamb dip signal to control the optical pump.

28. The method of claim 25 further comprising the step of stabilizing a high-finesse optical cavity by monitoring movement of the mirrors and adjusting the position of the mirrors in response to the movement.

29. The method of claim 25 further comprising the step of coupling the emitted radiation to a fiber optic.

30. The method of claim 25 wherein each particle transits the cavity in less than one microsecond.

* * * * *